UNITED STATES PATENT OFFICE.

DANIEL F. OVERTON AND WILLIS E. OVERTON, OF SOLOMON'S, MARYLAND.

METHOD OF TREATING FISH-SEINES.

SPECIFICATION forming part of Letters Patent No. 453,819, dated June 9, 1891.

Application filed April 26, 1890. Serial No. 349,680. (No specimens.)

*To all whom it may concern:*

Be it known that we, DANIEL F. OVERTON and WILLIS E. OVERTON, citizens of the United States, residing at Solomon's, in the county of Calvert and State of Maryland, have invented certain new and useful Improvements in Methods of Treating Fish-Seines, of which the following is a specification.

This invention relates to a method of treating fish-seines to preserve them from the destructive effects of fish-slime. This method is applicable to seines or nets whose mesh-cords or twines have not been coated with water-repellant, such as tar. In these seines the water at once saturates the cords or twines composing the netting or meshes, and when the seine has been drawn and allowed to lie for a time on the ground it dries or partially dries, and then is again put into the water and again drawn out and allowed to dry, as before. Fishermen go through this operation with their seines a number of times daily. It has been found that under the above circumstances the slime that is naturally given off from fish gets upon the net, and in a short time it so affects it that the seine is soon destroyed or rendered worthless.

The object of our invention is to obviate the ruinous effects of this slime, and this we do by the following method.

When the seine has been drawn from the water and while yet wet and covered with slime, we apply to the seine a solution of water and lime. The solution as we use it is composed of water, forty gallons; lime, one-half bushel. These proportions are efficient, but may be varied.

The solution may be applied to the seine in any desired manner. One way is to pile the seine on the ground, and throw the lime solution over it by means of a suitable vessel. We have found that this treatment keeps the seine in good condition and will cause it to last indefinitely and be unaffected by the frequent wetting and drying and fish-slime.

By making a solution of the lime and water the alkaline properties of the lime are utilized, which destroy the slime by chemical action, whereas if the lime were used as a mixture with water or as a whitewash, as is done in preventing mildew, &c., the solid particles of the lime would be deposited upon the seine, which would be very objectionable.

Having described our invention, we claim—

The herein-described method of treating fish-seines to preserve them from the deleterious effects of fish-slime, consisting of applying to the seine after it has been drawn from the water and while wet and covered with slime a solution of water and lime, as set forth.

In testimony whereof we affix our signatures in the presence of two witnesses.

DANIEL F. OVERTON.
WILLIS E. OVERTON.

Witnesses:
JOHN E. MORRIS,
JNO. T. MADDOX.